United States Patent
Tang

(10) Patent No.: US 10,162,224 B2
(45) Date of Patent: Dec. 25, 2018

(54) TRANSMISSION-REFLECTION BLUE PHASE LIQUID CRYSTAL PANEL

(71) Applicant: Wuhan China Star Optoelectronics Technology Co., Ltd., Wuhan (CN)

(72) Inventor: Yuejun Tang, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 14/897,351

(22) PCT Filed: Aug. 17, 2015

(86) PCT No.: PCT/CN2015/087265
§ 371 (c)(1),
(2) Date: Dec. 10, 2015

(87) PCT Pub. No.: WO2017/020346
PCT Pub. Date: Feb. 9, 2017

(65) Prior Publication Data
US 2018/0157073 A1    Jun. 7, 2018

(30) Foreign Application Priority Data

Aug. 4, 2015 (CN) .......................... 2015 1 0470320

(51) Int. Cl.
*G02F 1/1335* (2006.01)
*G02F 1/1343* (2006.01)
*G02F 1/1337* (2006.01)
*G02F 1/137* (2006.01)

(52) U.S. Cl.
CPC ...... *G02F 1/1343* (2013.01); *G02F 1/133553* (2013.01); *G02F 1/133555* (2013.01); *G02F 1/133707* (2013.01); *G02F 2001/13793* (2013.01)

(58) Field of Classification Search
CPC ..... G02F 2001/13793; G02F 1/133707; G02F 1/133555
See application file for complete search history.

(56) References Cited

U.S. PATENT DOCUMENTS

2005/0024559 A1* 2/2005 Okumura .......... G02F 1/133555
349/114
2005/0190324 A1   9/2005 Yang
(Continued)

FOREIGN PATENT DOCUMENTS

CN         101943815 A      1/2011

OTHER PUBLICATIONS

Office Action dated Jul. 14, 2017 by the State Intellectual Property Office of the People's Republic of China in corresponding Chinese Patent Application No. 201510470320.8. (7 pages).
(Continued)

*Primary Examiner* — Kendrick Hsu
(74) *Attorney, Agent, or Firm* — Buchanan Ingersoll & Rooney PC

(57) ABSTRACT

A transmission-reflection blue phase liquid crystal panel is disclosed. The transmission-reflection blue phase liquid crystal panel comprises an upper substrate and a lower substrate that are arranged facing each other, and blue phase liquid crystal that is arranged between the upper substrate and the lower substrate. The upper substrate, on a surface thereof facing the blue phase liquid crystal, is provided with a first electrode base layer which has a plurality of first protrusions, and the lower substrate, on a surface thereof facing the blue phase liquid crystal, is provided with a second electrode base layer which has a plurality of second protrusions. The first protrusions each extend to a position between two adjacent second protrusions, and the second protrusions each extend to a position between two adjacent first protrusions. According to the present disclosure, a (Continued)

consistent photoelectric property in the transmission region and the reflection region can be obtained and the driving voltage of the blue phase liquid crystal can be reduced.

7 Claims, 2 Drawing Sheets

(56) References Cited

U.S. PATENT DOCUMENTS

| | | | |
|---|---|---|---|
| 2011/0249229 A1* | 10/2011 | Kubota | G02F 1/133707 349/141 |
| 2012/0212693 A1* | 8/2012 | Kubota | G02F 1/133707 349/96 |
| 2012/0327350 A1 | 12/2012 | Chang et al. | |
| 2014/0028960 A1 | 1/2014 | Chen et al. | |
| 2014/0307206 A1 | 10/2014 | Xie | |

OTHER PUBLICATIONS

Notification of Transmittal of the International Search Report and the Written Opinion of the International Searching Authority (Forms PCT/ISA/220, PCT/ISA/210, and PCT/ISA/237) dated Apr. 27, 2016, by the State Intellectual Property Office of People's Republic of China in corresponding International Application No. PCT/CN2015/087265. (13 pages).

Office Action dated Mar. 20, 2018, by the State Intellectual Property Office of the People's Republic of China in corresponding Chinese Patent Application No. 201510470320.8. (7 pages).

\* cited by examiner

TRANSMISSION-REFLECTION BLUE PHASE LIQUID CRYSTAL PANEL

CROSS REFERENCE TO RELATED APPLICATION

The present application claims priority of Chinese patent application CN201510470320.8, entitled "Transmission-reflection Blue Phase Liquid Crystal Panel" and filed on Aug. 4, 2015, the entirety of which is incorporated herein by reference.

FIELD OF THE INVENTION

The present disclosure relates to the technical field of liquid crystal display, and particularly to a transmission-reflection blue phase liquid crystal panel.

BACKGROUND OF THE INVENTION

In a transmission region of a transmission-reflection blue phase liquid crystal display device, a backlight source is used as a light source thereof, and thus light passes through the liquid crystal layer only once. While in a reflection region of the transmission-reflection blue phase liquid crystal display device, ambient light is used as a light source thereof, and thus light passes through the liquid crystal layer twice. As a result, a phase delay of the light when passing through the reflection region is twice a phase delay of the light when passing through the transmission region. Consequently, in the transmission region and the reflection region, it is difficult to obtain a same transmission and reflection photoelectric property.

In order to obtain a same phase delay and a photoelectric property curve with a high matching degree in the transmission region and the reflection region, a transmission-reflection blue phase liquid crystal display device with double cell thickness is raised in this field. That is, a thickness of a liquid crystal cell in the transmission region is twice that in the reflection region. With this design, the phase delay of the light when passing through the reflection region is the same as the phase delay of the light when passing through the transmission region, and thus a same transmission and reflection photoelectric property can be obtained in the transmission region and the reflection region. However, since the manufacturing procedure of the transmission-reflection blue phase liquid crystal display panel with double cell thickness is complicated, the inconsistent between the photoelectric property curve and the response time in the transmission region and those in the reflection region would easily be resulted in due to the error of the thickness of the liquid crystal cell generated during the manufacturing procedure.

Moreover, blue phase liquid crystal is facing a problem of over high driving voltage. At present, the problem is generally solved through improving the performance of the blue phase liquid crystal material or optimizing the structure of the electrode used therein. The performance of the blue phase liquid crystal material can be improved mainly through improving the manufacturing procedure of the material, so that the blue phase liquid crystal material with a large Kerr constant can be obtained. However, since the process of synthesizing blue phase liquid crystal material is rather complex, for example, the factors of monomer, photoinitiator, synthesis condition, etc should be taken into consideration when the blue phase liquid crystal of stable polymer is manufactured, the research and development cost thereof is rather high. With respect to the method of optimizing the structure of the electrode, since blue phase liquid crystal display device is mainly driven in an In-Plane Switching (IPS) mode, a penetration depth of a horizontal electric field generated by the parallel electrodes is limited, and a relatively high driving voltage is still needed.

With respect to the aforesaid technical problem, a blue phase liquid crystal display device in which a consistent photoelectric property in the transmission region and the reflection region can be obtained and the driving voltage of the blue phase liquid crystal can be reduced is needed.

SUMMARY OF THE INVENTION

With respect to the aforesaid technical problem, the present disclosure provides a transmission-reflection blue phase liquid crystal panel.

The transmission-reflection blue phase liquid crystal panel comprises an upper substrate and a lower substrate that are arranged facing each other, and blue phase liquid crystal that is arranged between the upper substrate and the lower substrate. The upper substrate, on a surface thereof facing the blue phase liquid crystal, is provided with a first electrode base layer which has a plurality of first protrusions, and the lower substrate, on a surface thereof facing the blue phase liquid crystal, is provided with a second electrode base layer which has a plurality of second protrusions. The first protrusions each extend to a position between two adjacent second protrusions, and the second protrusions each extend to a position between two adjacent first protrusions.

In the transmission-reflection blue phase liquid crystal panel according to the present disclosure, the upper substrate and the lower substrate are provided with the first electrode base layer and the second electrode base layer respectively, and electrodes are formed on a corresponding electrode base layer, whereby the display function of the liquid crystal display device can be realized. Through arranging a structure of each electrode base layer, which means mainly designing and matching the first protrusion and the second protrusion, for example, regulating a horizontal distance or vertical distance between the first protrusion and the second protrusion, an electric field strength in the transmission region and that in the reflection region can both be regulated, so that the reflection region and the transmission region in the liquid crystal display device can have a consistent photoelectric property. Moreover, according to the present disclosure, the first electrode base layer and the second electrode base layer are provided with a corresponding electrode respectively, so that a horizontal electric field in the blue phase liquid crystal can be increased. That is, in the liquid crystal layer, a higher electric field strength can be formed in horizontal direction. Therefore, liquid crystal molecules in the blue phase liquid crystal can have a larger optical anisotropy in horizontal direction, and thus the driving voltage of blue phase liquid crystal can be reduced.

According to some embodiments, the first electrode base layer comprises a first baseplate, and the first protrusions are arranged on the first baseplate spaced from one another. The second electrode base layer comprises a second baseplate, and the second protrusions are arranged on the second baseplate spaced from one another. According to this technical solution, the first protrusions are arranged on the first baseplate spaced from one another, and the second protrusions are arranged on the second baseplate spaced from one another, so that the first electrode base layer and the second electrode base layer both have an integrated structure. In this manner, on the one hand, the first electrode base layer and the second electrode base layer can be formed on the corresponding substrate conveniently, and on the other hand, cooperation between the first electrode base layer and the second electrode base layer can be formed easily.

According to some embodiments, a horizontal distance between the first protrusion and the second protrusion in a transmission region of the transmission-reflection blue phase liquid crystal panel is less than that between the first protrusion and the second protrusion in a reflection region of the transmission-reflection blue phase liquid crystal panel. According to this technical solution, the electric field strength in the reflection region can be reduced, so that the liquid crystal molecules in the reflection region can have a smaller optical anisotropy compared with those in the transmission region, and the reflection region and the transmission region can have a consistent photoelectric property.

According to some embodiments, a vertical distance between the second protrusion and the first baseplate in a transmission region of the transmission-reflection blue phase liquid crystal panel is less than or equal to that between the second protrusion and the first baseplate in a reflection region of the transmission-reflection blue phase liquid crystal panel. With this arrangement, the electric field strength in the reflection region can be further reduced.

According to some embodiments, the first protrusion is provided with a common electrode, and the second protrusion is provided with a pixel electrode. The first protrusion and the second protrusion are provided with a corresponding electrode respectively, and the first electrode base layer and the second electrode base layer are provided on a corresponding substrate respectively, so that the reflection region and the transmission region of the liquid crystal display device can have a consistent photoelectric property, and a good operational performance of the liquid crystal display device can be realized.

According to some embodiments, an area of the first baseplate corresponding to the second protrusion is not provided with the common electrode. An area of the second baseplate corresponding to the first protrusion is not provided with the pixel electrode. With this arrangement, a vertical electric field strength of the liquid crystal panel can be reduced, and a horizontal electric field strength thereof can be increased. Therefore, the liquid crystal molecules in the blue phase liquid crystal can have a larger optical anisotropy in horizontal direction, and transmissivity of light in blue phase liquid crystal can be improved.

According to some embodiments, the pixel electrode comprises a first pixel electrode and a second pixel electrode. One of the two adjacent second protrusions is provided with the first pixel electrode, and the other one of the two adjacent second protrusions is provided with the second pixel electrode. A horizontal electric field is formed between the first pixel electrode and the second pixel electrode. With this arrangement, the horizontal electric field strength of the liquid crystal panel can be further improved, and the transmissivity of light in blue phase liquid crystal can be further improved accordingly.

According to some embodiments, the reflection region of the transmission-reflection blue phase liquid crystal panel comprises a reflection layer, and the reflection layer is arranged between the lower substrate and the second electrode base layer. According to this technical solution, the reflection layer can be arranged simply and conveniently, and thus the operational procedure thereof can be greatly simplified.

According to some embodiments, the first protrusion is provided with a common electrode, and the second protrusion is arranged as a pixel electrode. A second common electrode is arranged between the pixel electrode and the reflection layer. With this arrangement, a horizontal electric field can be generated, whereby the transmissivity of light in blue phase liquid crystal can be further improved.

According to some embodiments, the reflection region of the transmission-reflection blue phase liquid crystal panel comprises a reflection layer that is manufactured by the pixel electrode, and the reflection layer is arranged on the second electrode base layer. According to this technical solution, the reflection layer is manufactured by the pixel electrode and is arranged on the surface of the second electrode base layer.

The present disclosure provides a transmission-reflection blue phase liquid crystal panel with single cell thickness, and the manufacturing procedure of the panel is simple. The electric field strength in the reflection region can be reduced through increasing the distance between the first protrusion and the second protrusion, and the distance between the second protrusion and the first baseplate in the reflection region of the transmission-reflection blue phase liquid crystal panel, so that the reflection region and the transmission region can have a consistent photoelectric property. At the same time, with the arrangement of the common electrode and the pixel electrode according to the present disclosure, a stronger horizontal electric field can be generated. Therefore, the transmissivity of light in blue phase liquid crystal can be improved, and the driving voltage of blue phase liquid crystal can be reduced.

BRIEF DESCRIPTION OF THE DRAWINGS

The present disclosure will be illustrated in detail hereinafter with reference to the embodiments and the drawings. In the drawings.

Figure 1:
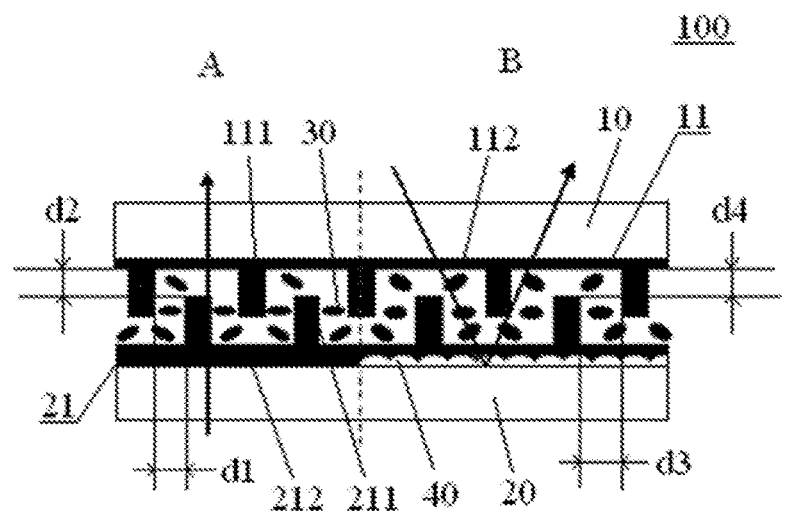
FIG. 1 schematically shows a structure of a transmission-reflection blue phase liquid crystal panel according to the present disclosure.

In the drawings, a same component is represented by a same reference sign. The drawings are not drawn according to actual scale.

DETAILED DESCRIPTION OF THE EMBODIMENTS

The present disclosure will be further illustrated hereinafter with reference to the drawings.

The details described herein are only specific examples used for discussing the implementations of the present disclosure. The most useful and most understandable description on the principle and concept of the present disclosure is provided. The structural details which go beyond the scope of basic understanding of the present disclosure are not provided herein. Therefore, those skilled in the art can clearly understand, based on the description and the accompanying drawings, how to implement the present disclosure in different ways.

FIG. 1 schematically shows a structure of a transmission-reflection blue phase liquid crystal panel 100 according to the present disclosure. The liquid crystal panel 100 comprises an upper substrate 10 and a lower substrate 20 that are arranged facing each other, and blue phase liquid crystal 30 that is arranged between the upper substrate 10 and the lower substrate 20. The upper substrate 10, on a surface thereof facing the blue phase liquid crystal 30, is provided with a first electrode base layer 11 which has a plurality of first protrusions 111, and the lower substrate 20, on a surface thereof facing the blue phase liquid crystal 30, is provided with a second electrode base layer 21 which has a plurality of second protrusions 211. The first protrusions 111 each extend to a position between two adjacent second protrusions 211, and the second protrusions 211 each extend to a position between two adjacent first protrusions 111. Here, the first electrode base layer 11 and the second electrode base layer 21 are both made of insulation material.

The liquid crystal display device 100 is divided into a transmission region A and a reflection region B by a dotted line as shown in FIG. 1. According to the present disclosure, the upper substrate 10 and the lower substrate 20 are provided with the first electrode base layer 11 and the second electrode base layer 21 respectively, and electrodes are formed on a corresponding electrode base layer, whereby the display function of the liquid crystal display device 100 can be realized. Through arranging a structure of each electrode base layer, which means mainly designing and matching the first protrusion 111 and the second protrusion 211, for example, regulating a horizontal distance or vertical distance between the first protrusion 111 and the second protrusion 211, an electric field strength in the transmission region A and that in the reflection region B can both be regulated, so that the transmission region A and the reflection region B in the liquid crystal display device 100 can have a consistent photoelectric property. The specific arrangement of the electrodes is not shown in FIG. 1 and will be illustrated in detail hereinafter.

According to the embodiment as shown in FIG. 1, the first electrode base layer 11 comprises a first baseplate 112, and the first protrusions 111 are arranged on the first baseplate 112 spaced from one another. The second electrode base layer 21 comprises a second baseplate 212, and the second protrusions 211 are arranged on the second baseplate 212 spaced from one another. According to this technical solution, the first protrusions 111 are arranged on the first baseplate 112 spaced from one another, and the second protrusions 211 are arranged on the second baseplate 212 spaced from one another, so that the first electrode base layer 11 and the second electrode base layer 21 both have an integrated structure. In this manner, on the one hand, the first electrode base layer 11 and the second electrode base layer 21 can be formed on the corresponding glass substrate conveniently, and on the other hand, cooperation between the first electrode base layer 11 and the second electrode base layer 21 can be formed easily.

Preferably, as shown in FIG. 1, a horizontal distance d1 between the first protrusion 111 and the second protrusion 211 in a transmission region A of the transmission-reflection blue phase liquid crystal panel 100 is less than a horizontal distance d3 between the first protrusion 111 and the second protrusion 211 in a reflection region B of the transmission-reflection blue phase liquid crystal panel 100. That is, d3 is larger than d1. According to this technical solution, since d3 is larger than d1, the electric field strength in the reflection region B can be reduced. Therefore, the liquid crystal molecules in the reflection region B can have a smaller optical anisotropy compared with those in the transmission region A, and the transmission region A and the reflection region B can have a consistent photoelectric property. It can be understood that, according to this technical solution, as long as it can be ensured that a phase delay of light when passing through the horizontal distance d3 between the first protrusion 111 and the second protrusion 211 in the reflection region B is twice a phase delay of light when passing through the horizontal distance d1 between the first protrusion 111 and the second protrusion 211 in the transmission region A, a consistent photoelectric property in the transmission region and the reflection region can be obtained. Therefore, the specific values of d3 and d1 can be arranged according to this principle.

Preferably, a vertical distance d2 between the second protrusion 211 and the first baseplate 112 in the transmission region A of the transmission-reflection blue phase liquid crystal panel 100 is less than or equal to a vertical distance d4 between the second protrusion 211 and the first baseplate 112 in the reflection region B of the transmission-reflection blue phase liquid crystal panel 100. According to this technical solution, as long as it can be ensured that a phase delay of light when passing through the vertical distance d4 between the second protrusion 211 and the first baseplate 112 in the reflection region B is twice a phase delay of light when passing through the vertical distance d2 between the second protrusion 211 and the first baseplate 112 in the transmission region A, a consistent photoelectric property in the transmission region and the reflection region can be obtained. It can be understood that, when d3 is larger than d1, d4 can be equal to or larger than d2. When d4 is larger than d2, the electric field strength in the reflection region B can be further reduced.

According to the present disclosure, the first protrusion 111 is provided with a common electrode, and the second protrusion 211 is provided with a pixel electrode. The first protrusion 111 and the second protrusion 211 are provided with a corresponding electrode respectively, and the first electrode base layer 11 and the second electrode base layer 21 are provided on a corresponding substrate respectively, so that the reflection region B and the transmission region A of the liquid crystal display panel 100 can have a consistent photoelectric property, and a good operational performance of the liquid crystal display panel 100 can be realized. Moreover, according to the present disclosure, the first electrode base layer 11 and the second electrode base layer 21 are provided with a corresponding electrode respectively, so that a horizontal electric field in the blue phase liquid crystal can be increased. That is, in the liquid crystal layer, a higher electric field strength can be formed in horizontal direction. Therefore, liquid crystal molecules in the blue phase liquid crystal can have a larger optical anisotropy in horizontal direction, and thus the driving voltage of blue phase liquid crystal can be reduced. The arrangement mode of the electrode in the blue phase liquid crystal panel 100 will be specifically illustrated hereinafter.

Figure 2:
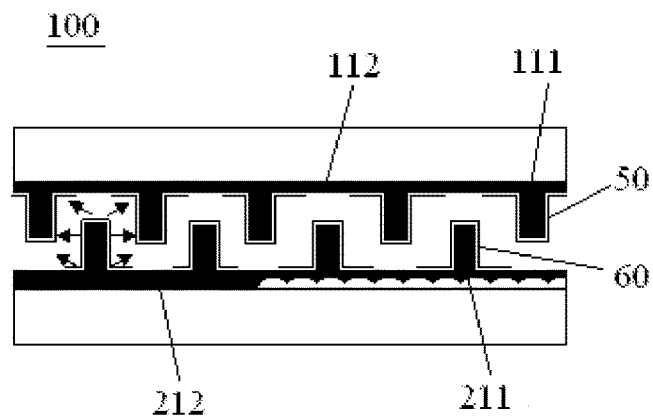
FIG. 2 schematically shows a common electrode and a pixel electrode according to a first embodiment of the present disclosure.

According to the embodiment as shown in FIG. 2, an area of the first baseplate 112 corresponding to the second protrusion 211 is not provided with the common electrode 50. An area of the second baseplate 212 corresponding to the first protrusion 111 is not provided with the pixel electrode 60. As shown in FIG. 2, the arrows refer to the directions of the electric field generated in the liquid crystal panel 100. With this arrangement, a vertical electric field strength of the liquid crystal panel 100 can be reduced, and a horizontal electric field strength thereof can be increased by a corresponding part of the common electrode 50 and the pixel electrode 60. Therefore, the liquid crystal molecules in the blue phase liquid crystal can have a larger optical anisotropy in horizontal direction, and transmissivity of light in blue phase liquid crystal can be improved. It should be noted that, according to the present disclosure, the horizontal electric field means an electric field parallel to the upper substrate 10 and the lower substrate 20.

Figure 3:
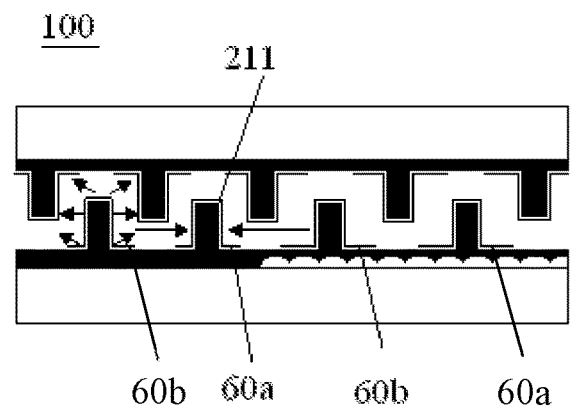
FIG. 3 schematically shows a common electrode and a pixel electrode according to a second embodiment of the present disclosure.

Preferably, according to the embodiment as shown in FIG. 3, the difference thereof from the embodiment as shown in FIG. 2 lies in that, the pixel electrode comprises a first pixel electrode 60a and a second pixel electrode 60b. One of the two adjacent second protrusions 211 is provided with the first pixel electrode 60a, and the other one of the two adjacent second protrusions is provided with the second pixel electrode 60b. A horizontal electric field (as shown by the arrows in FIG. 3) is formed between the first pixel electrode 60a and the second pixel electrode 60b. The first pixel electrode 60a and the second pixel electrode 60b are controlled by a corresponding Thin Film Transistor (TFT) respectively, so that an electric field can be formed both between the first pixel electrode 60a and a corresponding common electrode, and between the second pixel electrode 60b and the corresponding common electrode. The electric field between the first pixel electrode 60a and the corresponding common electrode and the electric field between the second pixel electrode 60b and the corresponding common electrode are symmetrical to each other but with an opposite direction. In this manner, a horizontal electric field can be formed between the first pixel electrode 60a and the common electrode, and between the second pixel electrode 60b and the common electrode. Besides, since an electric potential difference exists between the first pixel electrode 60a and the second pixel electrode 60b, a horizontal electric field can also be formed therebetween. That is, the horizontal electric field strength in the transmission-reflection liquid crystal panel 100 can be further improved. Therefore, the transmissivity of light in blue phase liquid crystal can be improved, and the driving voltage of blue phase liquid crystal can be reduced.

According to the present disclosure, as shown in FIG. 1, the reflection region B of the transmission-reflection blue phase liquid crystal panel 100 comprises a reflection layer 40, and the reflection layer 40 is arranged between the lower substrate 20 and the second electrode base layer 21. According to this technical solution, the reflection layer 40 can be arranged simply and conveniently, and thus the operational procedure thereof can be greatly simplified.

Figure 4:
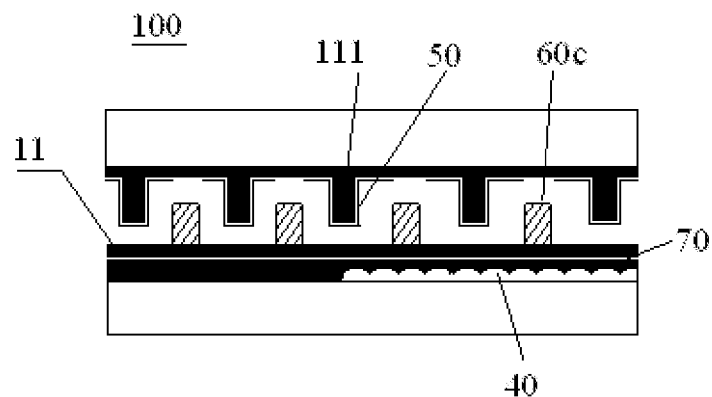
FIG. 4 schematically shows a common electrode and a pixel electrode according to a third embodiment of the present disclosure.

According to the embodiment as shown in FIG. 4, the first protrusion 111 is provided with a common electrode 50, and the second protrusion 60c is completely made of the pixel electrode 60 as shown in FIG. 2. A second common electrode 70 is arranged between the second protrusion 60c and a reflection layer 40, and the second common electrode 70 is insulated from the second protrusion 60c and a reflection layer 40. The common electrode 50 and the second common electrode 70 provide a same common signal to the second protrusion 60c. Under this circumstances, a vertical electric field cannot be formed between the common electrode 50 and the second common electrode 70, while a horizontal electric field can be formed both between the second protrusion 60c and the common electrode 50, and between the second protrusion 60c and the second common electrode 70. Due to the second common electrode 70 provided therein, the electric field formed in the liquid crystal layer can have a larger horizontal component. That is, in the liquid crystal layer, a higher electric field strength can be formed in horizontal direction. Therefore, liquid crystal molecules in the blue phase liquid crystal can have a larger optical anisotropy in horizontal direction, and thus the driving voltage of blue phase liquid crystal can be reduced.

Figure 5:
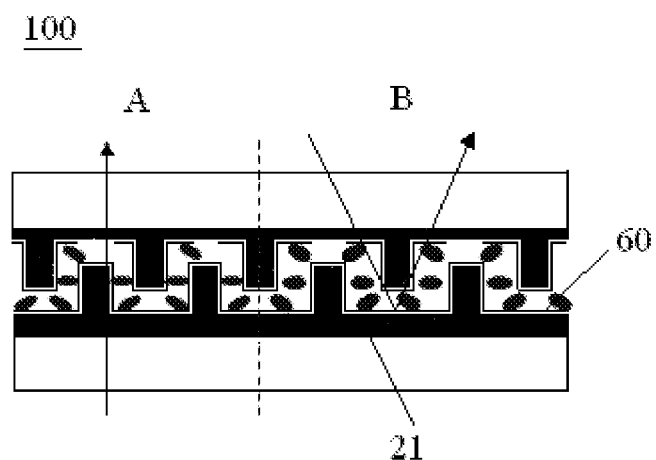
FIG. 5 schematically shows a structure of a reflection layer of the transmission-reflection blue phase liquid crystal panel according to the present disclosure.

According to the embodiment as shown in FIG. 5, the reflection region B of the transmission-reflection blue phase liquid crystal panel 100 comprises a reflection layer that is manufactured by the pixel electrode 60, and the reflection layer is arranged on the second electrode base layer 21. According to this technical solution, the reflection layer is manufactured by the pixel electrode 60 and is arranged on the surface of the second electrode base layer 21. Preferably, the pixel electrode 60 can be made of metal material with high reflectivity.

According to the present disclosure, the transmission-reflection blue phase liquid crystal panel 100 can be manufactured simply. The reflection region and the transmission region of the panel have a consistent photoelectric property. At the same time, with the arrangement of the common electrode and the pixel electrode according to the present disclosure, a stronger horizontal electric field can be generated. Therefore, the transmissivity of light in blue phase liquid crystal can be improved, and the driving voltage of blue phase liquid crystal can be reduced.

It should be noted that, the above embodiments are described only for better understanding, rather than restricting the present disclosure. Those skilled in the art can make amendments to the present disclosure within the scope as defined in the claims and without departing from the spirit and scope of the present disclosure. The present disclosure is described according to specific methods, materials, and implementations, but the present disclosure is not restricted by the details disclosed herein. On the contrary, the present disclosure is applicable for the equivalent structures, methods, and applications with the same functions as those defined in the claims.

The invention claimed is:

1. A transmission-reflection blue phase liquid crystal panel, comprising an upper substrate and a lower substrate that are arranged facing each other, and blue phase liquid crystal that is arranged between the upper substrate and the lower substrate,
    wherein the upper substrate, on a surface thereof facing the blue phase liquid crystal, is provided with a first electrode base layer which has a plurality of first protrusions, and the lower substrate, on a surface thereof facing the blue phase liquid crystal, is provided with a second electrode base layer which has a plurality of second protrusions;
    wherein the first protrusions each extend to a position between two adjacent second protrusions, and the second protrusions each extend to a position between two adjacent first protrusions;
    wherein the first electrode base layer comprises a first baseplate, and the first protrusions are arranged on the first baseplate spaced from one another;
    wherein the second electrode base layer comprises a second baseplate, and the second protrusions are arranged on the second baseplate spaced from one another; and
    wherein a horizontal distance between adjacent first protrusions and second protrusions in a transmission region of the transmission-reflection blue phase liquid crystal panel is less than that between adjacent first protrusions and second protrusions in a reflection region of the transmission-reflection blue phase liquid crystal panel.

2. The panel according to claim 1, wherein a vertical distance between the plurality of second protrusions and the first baseplate in the transmission region of the transmission-reflection blue phase liquid crystal panel is less than or equal to that between the plurality of second protrusions and the first baseplate in the reflection region of the transmission-reflection blue phase liquid crystal panel.

3. The panel according to claim 1, wherein each of the plurality of the first protrusions is provided with a common electrode, and each of the plurality of the second protrusions is provided with a pixel electrode.

4. The panel according to claim 3,
wherein an area of the first baseplate corresponding to each of the plurality of the second protrusions is not provided with the common electrode; and
wherein an area of the second baseplate corresponding to each of the plurality of the first protrusions is not provided with the pixel electrode.

5. The panel according to claim 3,
wherein the pixel electrode comprises a first pixel electrode and a second pixel electrode;
wherein one of the two adjacent second protrusions is provided with the first pixel electrode, and the other one of the two adjacent second protrusions is provided with the second pixel electrode; and
wherein a horizontal electric field is formed, between the first pixel electrode and the second pixel electrode.

6. The panel according to claim 1, wherein the reflection region of the transmission-reflection blue phase liquid crystal panel comprises a reflection layer; and wherein the reflection layer is arranged between the lower substrate and the second electrode base layer.

7. The panel according to claim 6, wherein each of the plurality of the first protrusions is provided with a common electrode, and each of the plurality of the second protrusions is arranged as a pixel electrode; and wherein a second common electrode is arranged between the pixel electrode and the reflection layer.

* * * * *